United States Patent Office 3,576,686
Patented Apr. 27, 1971

3,576,686
METHOD OF MAKING MICROPOROUS FILMS
Claude J. Schmidle, Hudson, and George Shkapenko, Akron, Ohio, assignors to The General Tire & Rubber Company
No Drawing. Filed Sept. 18, 1968, Ser. No. 760,683
Int. Cl. B32b 5/18
U.S. Cl. 156—77                7 Claims

ABSTRACT OF THE DISCLOSURE

A method of making a microporous film comprising admixing to a liquid plastisol-type resin a water-soluble material, that is soluble in the liquid plasticizer and a nonsolvent for the polymer particles, casting a film therefrom, curing the film by applying sufficient heat to cause fusion between the polymer particles, and washing the water-soluble material from the film to create voids in the film for passage of moisture.

BACKGROUND OF THE INVENTION

Field of the invention

This invention relates to the field of plastic films. More particularly, this invention relates to the field of films cast from plastisol-type resins and to a method of imparting to the films moisture permeability.

Description of the prior art

There is a growing demand for films and fabrics possessing a combination of properties including flexural strength, abrasion resistance, and moisture permeability. This demand is based on a growing awareness in industry and commerce that naturally occurring products such as leather, cotton, and wool do not possess properties sufficient for the sophisticated requirement of today's markets. In the shoe industry, research and development activities are directed toward seeking a substitute for leather that exhibits abrasion resistance, absent in leather, as well as moisture permeability, flexural strength, and other properties possessed by leather. In the fabric industry, decorative fabrics plagued by low strength are being made into usable wearing apparel and upholstery furnishings by laminating them to strong, moisture permeable plastic films and foams.

Man-made moisture permeable substrates may be in many forms, however, this invention deals with the type known as "microporous films." In the general structure of microporous films, a matrix of fused thermoplastic polymer particles provides the base film and throughout this matrix is a dispersion of tiny, microscopic sized, interconnected voids. It is through these voids that moisture passes through the film to give the film a "moisture-vapor transmission rate" (MTVR).

Because of the seemingly conflicting properties this film must possess, i.e., permeability to moisture yet good flexural strength, microporous films are difficult to make. The thermoplastic matrix provides flexural strength and abrasion resistance whereas the voids provide moisture permeability. Therefore a balance between these two phases is necessary to prevent one property from over-shadowing or seriously deteriorating another. In addition to be truly versatile a microporous film should be amenable to fabric lamination without losing its moisture permeability. This use of the film is difficult to achieve for the heat applied during lamination will melt the film and collapse the voids, unless steps are taken to preserve the void dispersion. Finally, the film should be made from inexpensive raw materials and be capable of large volume production to gain a price advantage over competitive naturally occurring products.

The prior art has made microporous films by dispersing thermoplastic polymer particles in an inert, solvent extractable material, casting and fusing a film therefrom, and leaching the inert material from the film with a solvent. United States Pat. 3,020,597, R. Smith-Johannsen teaches dispersing thermoplastic polymer particles in a highly viscous liquid, e.g., 2,000,000 centipoises, casting a film therefrom, fusing the polymer particles into a film matrix, and then leaching the inert liquid from the film with a solvent such as ethylene trichloride or mineral spirits. It can be readily observed that mixing a polymeric powder in such a viscous liquid requires a powerful mixer. In addition, organic solvents such as ethylene trichloride and mineral spirits are costly, require cautious use, and may damage certain fabrics should the film be laminated prior to solvent extraction. Moreover, use of organic solvents results in extraction of plasticizers from the established film.

Accordingly, it is an object of this invention to produce a microporous film for use either as a film or in a laminate structure that is highly permeable to moisture, abrasion resistant, and strong.

A further object of this invention is a method of producing a microporous film that does not require huge mixing or other preparation costs.

A further object of this invention is a method of producing a microporous film that requires only water as a solvent to extract the inert, void forming material.

A further object of this invention is a method of producing a microporous film from a plastisol-type resin using low cost materials.

A further object of this invention is a method of producing a microporous film that retains substantially all of its plasticizer throughout the solvent extraction step.

SUMMARY OF THE INVENTION

A method of making a microporous film comprising the steps of admixing to a plastisol-type resin a material selected from the group consisting of alkoxy terminated polyethylene oxide and ethylene oxide adducts of alkyl phenols, casting and curing a film therefrom and washing the film with a solvent to remove the admixed material and impart moisture permeability to the film.

DESCRIPTION OF THE PREFERRED EMBODIMENT

Plastisol-type resins comprise particles of thermoplastic polymer, e.g., polyvinyl chloride, dispersed in a continuous phase of non-volatile liquid plasticizer, e.g., dioctyl phthalate. Under ordinary conditions the resin has the appearance and consistency of buttermilk; the polymer particles maintain their discrete particulate form in the liquid plasticizer. Upon heating the resin, the particles absorb the surrounding plasticizer and swell in size such that, at slightly below the fusion temperature, the plasticizer is completely absorbed and all that remain are swollen polymer particles. At fusion temperatures, which depends upon the specific polymer, the particles interfuse to form an almost continuous phase of plasticized polymeric material. A relatively few number of voids remain where adjacent particles did not fully mate, however, the fused film is almost impervious to moisture. This film has a very low MVTF, in the area of 100 units (grams of water passing through 100 square meters of film per hour) and is used as a moisture barrier in food wrapping.

The basis of the present invention is the discovery of a class of materials that display a novel combination of properties the most important of which is forming moisture permeable films from heretofore moisture impermeable films. These materials are low viscosity liquids that can be admixed to plastisol-type resins without coagulating polymer particles. Moreover, the materials solubilize in the liquid plasticizer phase and do not dissolve or occlude the discrete polymer particles. In addition, the materials are water soluble and can be readily washed from the fused film. Furthermore, all these properties are retained by the materials throughout a temperature range that includes room temperature to polymer fusion temperatures. Such a class of materials possessing this combination of properties has been heretofore unknown and certainly could not have been predicted from the prior art. Certainly, such a class of materials that can be extracted from the film with water or other solvents that do not also extract plasticizer has been long sought in the plastic industry.

This novel class of materials comprises alkoxy terminated polyethylene oxides and ethylene oxide adducts of alkyl phenols. Particularly useful are monomethyl ethers of polyethylene oxide and nonylphenols adducted with from 10 to 30 moles of ethylene oxide. Other useful materials include octyl phenols adducted with from 10 to 30 moles of ethylene oxide and long chain aliphatic hydrocarbons containing water soluble end groups that are soluble in plastisol-type resin plasticizers and insoluble (a non-solvent) to the polymer particles.

The material is directly admixed to the plastisol-type resin where it solubilizes in the liquid plasticizer and remain inert. Upon heating a film cast from the resin the plasticizer is absorbed into the polymer particles leaving behind the material in the form of uniformly dispersed, microscopic-sized droplets. As fusion takes place between the polymer particles, these droplets remain inert except that they prevent fusion in the space they occupy by keeping the polymer particles separated. After the fused film is cooled the material is removed by washing the film in a solvent such as water. Other polar solvents that will not attack the polymer, i.e., that are solvents for the material but non-solvents for the polymer, such as methanol, ethanol, propanol, isopropanol, and aqueous solutions thereof can be used in lieu of water. It is particularly important that the solvent be a non-solvent for the plasticizer. Plasticizer extraction will produce a less flexible film and, in some cases, a useless film. Therefore, non-plasticizer soluble solvents, such as water and water-alcohol mixtures, are preferred and form an important part of this invention. The material may be admixed in various amounts; the more material admixed the more voids will be created to produce a greater degree of permeability. Experiments have demonstrated that MVTR's of 4000 gm./100 M.$^2$/hr. can be achieved in films containing from about 10 to 30 parts of material per 100 parts of resin.

Microporous films produced by this invention can be laminated to fabrics and maintain their original permeability by a simple modification of the above-described process. The material is admixed to the resin and a film cast therefrom. The film is heated to a temperature sufficient to gel the film but not to fuse it. In the case of a polyvinyl chloride-dioctyl phthalate plastisol resin, the gel temperature is about 250° F. It is then laid upon a layer of cloth, the layers placed in a press, and heated to fusion temperatures; 350° F. in the fusion temperature for the aforementioned plastisol resin. Thereafter the laminate is cooled and washed with water to remove the admixed material. All of the admixed material need not be removed during this step. For most fabric-film laminates the admixed material will leach from the laminate during ordinary laundry washings so that removal of the material immediately upon laminate fabrication is not critical. It should be noted that by allowing the material to remain in the film during the fusion step the dispersed droplets of material are preserved intact and the voids created later are not damaged. Fabrics may be of the woven or non-woven type and may be of various compositions such as wool, cotton, and blends thereof. Synthetic polymeric fabrics may also be used, however, care must be taken to insure that the heat applied during lamination does not melt or otherwise deteriorate the fabric. Other usable substrates for lamination include paper and fiber for battery separators, porous ceramics for filters, and the like.

The advantages of this invention are numerous. Plastisol-type resins and many of the admixable materials disclosed are commercially available and relatively inexpensive. Admixing the low viscosity resin and material requires only nominal power and equipment costs. Thus the films that are made by this invention are inexpensive. The admixed materials do not increase film fusion temperatures thus this invention can be practiced on existing plastisol-type resin film casting equipment. Expensive and hazardous solvent leaching is eliminated and replaced by water washing. The film so produced is abrasion resistant, has good flexural strength, and a high MVTR. These and other features of the invention will become more apparent upon reading the examples set forth below; these examples are provided as an indication of how to practice the invention and are not to be construed as limiting the applicability or use thereof.

EXAMPLE I

A plastisol-type resin of polyvinyl chloride (Chem-O-Sol X–8760, Chemical Products Co.) was cast as a 16 mil thick film and cured in an oven at 350° F. for 10 minutes. The film was then cooled to room temperature. The MVTR was found to be 200 gm./100 m.$^2$/hr.

EXAMPLE II

To 100 parts of the plastisol-type resin of Example I was admixed 30 parts of liquid monomethoxy terminated polyethylene oxide (Carbowax 350, Union Carbide Co.). A 16 mil thick film was cast from this composition and cured in an oven at 350° F. for 10 minutes. The film was cooled to room temperature, washed in 70° C. water for 30 minutes and then dried at 60° C. The MVTR was found to be 4598 gm./100 m.$^2$/hr.

EXAMPLE III

To 100 parts of the plastisol-type resin of Example I was admixed 30 parts of a liquid nonyl phenol adducted with 20 moles of ethylene oxide (Tergitol NP–40, Union Carbide Co.). A film was cast, cured, and washed as in Example II. The MVTR was found to be 2040 gm./100 m.$^2$/hr.

EXAMPLE IV

To 100 parts of the plastisol-type resin of Example I was admixed 30 parts of liquid methoxy-terminated polyethylene oxide (Carbowax 350, Union Carbide Corp.). A 16 mil thick film was cast from this composition and gelled in an oven at 250° F. for two minutes. The gelled film was then fused to a piece of woven cotton fabric at 350° F. for 5 minutes under a pressure of 10 lbs./ft.$^2$. This laminate was cooled to room temperature, washed in 70° C. water for 30 minutes, and then dried at 60° C. The MVTR of the laminate was found to be 4500 gm./100 m.$^2$/hr.

It is readily apparant that those skilled in the art may modify the above-described preferred embodiment and examples to fit a wide variety of applications without escaping the teachings of the invention. Therefore, the scope of this invention should not be limited to the above but should be determined from the claims that follow when read in light of preferred embodiment.

What is claimed is:

1. A method of making a microporous film comprising the steps of:
    (a) admixing to a vinyl chloride plastisol-type resin a material selected from the group consisting of alkoxy terminated polyethylene oxide and ethylene oxide adducts of alkyl phenols to form a uniform dispersion;
    (b) casting a film from said dispersion;

(c) heating said film to a temperature sufficient to bring about fusion of the resin particles in said film;
(d) cooling said film to a temperature below the fusion temperature of the resin particles; and
(e) washing said film with a liquid that is a solvent for said material and a non-solvent for the resin and plasticizer, to remove said material and render said film permeable to moisture.

2. A method of making a laminate comprising at least one layer of fabric and at least one layer of microporous film comprising the steps of:
(a) admixing to a vinyl chloride plastisol-type resin a material selected from the group consisting of alkoxy terminated polyethylene oxide and ethylene oxide adducts of alkyl phenols to form a uniform dispersion;
(b) casting a film from said dispersion;
(c) heating said film to a temperature sufficient to cause gelling of the resin particles in said film but less than a temperature sufficient to bring about fusion of the resin particles in said film;
(d) placing at least one layer of said gelled film on at least one layer of fabric to form a laminate;
(e) heating said laminate under pressure to a temperature sufficient to bring about fusion of the resin particles;
(f) cooling said laminate to a temperature below the fusion temperature of the resin particles; and
(g) washing said laminate with a liquid that is a solvent for said material and a non-solvent for the resin particles, plasticizer, and said fabric, to remove said material and render said film permeable to moisture.

3. A method as described in claim 1 wherein said material selected from the group consisting of alkoxy terminated polyethylene oxide and ethylene oxide adducts of alkyl phenols is monomethoxy terminated polyethylene oxide.

4. A method as described in claim 1 wherein said material selected from the group consisting of alkoxy terminated polyethylene oxide and ethylene oxide adducts of alkyl phenols is nonyl phenol adducted with ethylene oxide in the amount of 10 to 30 moles of said ethylene oxide per mole of nonyl phenol.

5. A method as described in claim 1 wherein said material selected from the group consisting of alkoxy terminated polyethylene oxide and ethylene oxide adducts of alkyl phenols is octyl phenol adducted with ethylene oxide in the amount of 10 to 30 moles of said ethylene oxide per mole of octyl phenol.

6. A method as described in claim 1 wherein said liquid that is a solvent for said material and a non-solvent for the resin and plasticizer is selected from the group consisting of water, methanol, ethanol, propanol, isopropanol, and mixtures thereof.

7. A method as described in claim 1 wherein said material, consisting of alkoxy terminated polyethylene oxide and ethylene oxide adducts of alkyl phenols, is in the amount of 10 to 30 parts of said material per 100 parts of said plastisol-type resin.

References Cited
UNITED STATES PATENTS

| | | | |
|---|---|---|---|
| 3,062,760 | 11/1962 | Dermody et al. | 260—2.5 |
| 3,202,733 | 8/1965 | Strauss | 264—49 |
| 3,236,788 | 2/1966 | Smith-Johannsen | 264—41UX |
| 3,266,966 | 8/1966 | Patchell | 264—49X |
| 3,296,016 | 1/1967 | Murphy | 264—41UX |
| 3,375,209 | 3/1968 | Kemper | 260—2.5 |
| 3,376,238 | 4/1968 | Gregorian et al. | 260—2.5 |
| 3,379,658 | 4/1968 | Kemper | 260—2.5 |

BENJAMIN R. PADGETT, Primary Examiner

S. J. LECHERT, Jr., Assistant Examiner

U.S. Cl. X.R.

156—155, 242; 117—8, 21, 63, 98; 260—2.5M; 264—41, 49

PO-1050
(5/69)

UNITED STATES PATENT OFFICE
CERTIFICATE OF CORRECTION

Patent No. 3,576,686      Dated April 27, 1971

Inventor(s)      Claude J. Schmidle et al

It is certified that error appears in the above-identified patent and that said Letters Patent are hereby corrected as shown below:

Column 1, line 55, "(MTVR)" should read -- (MVTR). Column 2, line 63, "(MVTF)" should read -- (MVTR) --. Column 3, line 60 "in" should read -- is --.

Signed and sealed this 13th day of July 1971.

(SEAL)
Attest:

EDWARD M. FLETCHER, JR.          WILLIAM E. SCHUYLER, JR.
Attesting Officer                 Commissioner of Patents